(12) United States Patent
Zhang et al.

(10) Patent No.: US 10,677,062 B2
(45) Date of Patent: Jun. 9, 2020

(54) SYSTEMS AND METHODS FOR COATING TO CONTROL COMPONENT DIMENSIONS

(71) Applicant: General Electric Company, Schenectady, NY (US)

(72) Inventors: Hua Zhang, Greer, SC (US); Dale Joel Davis, Greenville, SC (US); David Terry Trayhan, Jr., Greenville, SC (US)

(73) Assignee: General Electric Company, Schenectady, NY (US)

(*) Notice: Subject to any disclaimer, the term of this patent is extended or adjusted under 35 U.S.C. 154(b) by 311 days.

(21) Appl. No.: 15/585,336

(22) Filed: May 3, 2017

(65) Prior Publication Data

US 2018/0320521 A1 Nov. 8, 2018

(51) Int. Cl.
| | | |
|---|---|---|
| *B22F 1/02* | (2006.01) | |
| *B22F 3/10* | (2006.01) | |
| *F01D 5/00* | (2006.01) | |
| *F02C 7/143* | (2006.01) | |

(52) U.S. Cl.
CPC ............ *F01D 5/005* (2013.01); *B22F 1/02* (2013.01); *B22F 3/10* (2013.01); *F02C 7/1435* (2013.01); *F05D 2230/31* (2013.01)

(58) Field of Classification Search
CPC ...... C10L 1/28; C10L 1/12; C10L 1/14; C10L 1/106; C23C 18/1204; C23C 18/1208; C23C 18/1212; C23C 18/1216; C23C 18/122; C23C 24/00; C23C 26/00; F01D 5/005; B22F 1/02; B22F 3/10

See application file for complete search history.

(56) References Cited

U.S. PATENT DOCUMENTS

| | | | | |
|---|---|---|---|---|
| 4,466,997 | A * | 8/1984 | Prescott | C10L 1/28 427/140 |
| 6,250,064 | B1 | 6/2001 | Tomlinson et al. | |
| 8,449,941 | B2 * | 5/2013 | Kim | C23C 4/02 427/255.15 |
| 2008/0107810 | A1 * | 5/2008 | Kim | C10L 1/28 427/251 |
| 2010/0242490 | A1 | 9/2010 | Symonds | |

OTHER PUBLICATIONS

Miksic, Boris et al.; "Water-based Coatings Powered by NANO-VpCl"; Cortec Corporation; pp. 9.

* cited by examiner

*Primary Examiner* — Michael P Wieczorek
(74) *Attorney, Agent, or Firm* — Hoffman Warnick LLC

(57) ABSTRACT

This disclosure provides methods and systems for using coatings to control component dimensions during operations of a mechanical system, such as gas turbine combustion air cooling system. The mechanical system may have a component with a critical dimension defined by at least one surface. Upon detecting a change in the critical dimension, such as from surface erosion, a coating additive is deployed into the mechanical system. The surface is coated with the coating additive to offset at least a portion of the change in the critical dimension.

10 Claims, 4 Drawing Sheets

SYSTEMS AND METHODS FOR COATING TO CONTROL COMPONENT DIMENSIONS

BACKGROUND

The disclosure relates generally to dynamic control of tolerances in a machine, and more particularly, to tolerance control in a spray nozzle, such as may be used in gas turbine systems and other machines.

A variety of machinery includes spray nozzles and other components that require precise internal dimensions to operate effectively. These same components can be subject to wear and deformation during operation that may alter one or more critical dimensions of the component. For example, a spray nozzle may be subject to mechanical and electrochemical erosion, causing the diameter of the aperture controlling fluid flow to increase and thereby decrease fluid pressure in the system and undermine the desired fluid velocity and dispersion. In some cases, decreased performance requires that the eroded spray nozzles be removed and replaced.

Some gas turbines may include a wet compression system to improve turbine operation power output in high temperatures (ambient air over about 60 degrees Fahrenheit). Wet compression systems may include a water injection rack mounting an array of spray nozzles, specifically small capacity hydraulic atomizers, connected to one or more valve-controlled water paths for precisely controlling location, timing, and pressure of water injected into the gas turbine for cooling. Such wet compression systems may create finely atomized water drops (1-50 micron diameter) injected into an air inlet duct through spray nozzle apertures with critical dimensions of less than several hundred microns. Droplet size is important to control the timing and distribution of evaporative cooling of water droplets entering the compressor stages. Changes of critical internal dimensions in the spray nozzle over time due to erosion may cause a greater variation in droplet sizes and/or increases in mean droplet size. These changes may have adverse impact on gas turbine performance and wear, including airfoil damage or degradation.

SUMMARY

A first aspect of this disclosure provides a method of using a surface coating to control component dimensions for a fluid path. A fluid system including a wear component having a critical dimension defined by at least one component surface is operating. A change in the critical dimension of the wear component from surface erosion of the at least one surface is detected. In response to detecting the change in the critical dimension, coating additive is dispensed into the fluid system during operation of the fluid system. At least one surface is coated with the coating additive to offset at least a portion of the change in the critical dimension.

A second aspect of the disclosure provides a system using a coating to control component dimensions. A fluid system includes a wear component having a critical dimension defined by at least one component surface. A controller detects a change in the critical dimension of the wear component from surface erosion of the at least one surface and generates a control signal based on detecting the change in the critical dimension. An additive system deploys a coating additive to form a coating layer on the at least one component surface during operation of the fluid system and in response to the control signal from the controller.

A third aspect of the disclosure provides a gas turbine combustion system. The system includes at least one fluid nozzle having an aperture width defined by at least one internal surface. A primary fluid path provides a primary fluid to the at least one fluid nozzle during operation of the gas turbine combustion system. An additive fluid path deploys an additive coating material into the primary fluid path in response to a control signal. The coating additive forms a coating layer on the at least one internal surface to reduce the aperture width. A controller detects a change in the aperture width of the at least one fluid nozzle and generates the control signal based on detecting the change in the aperture width.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
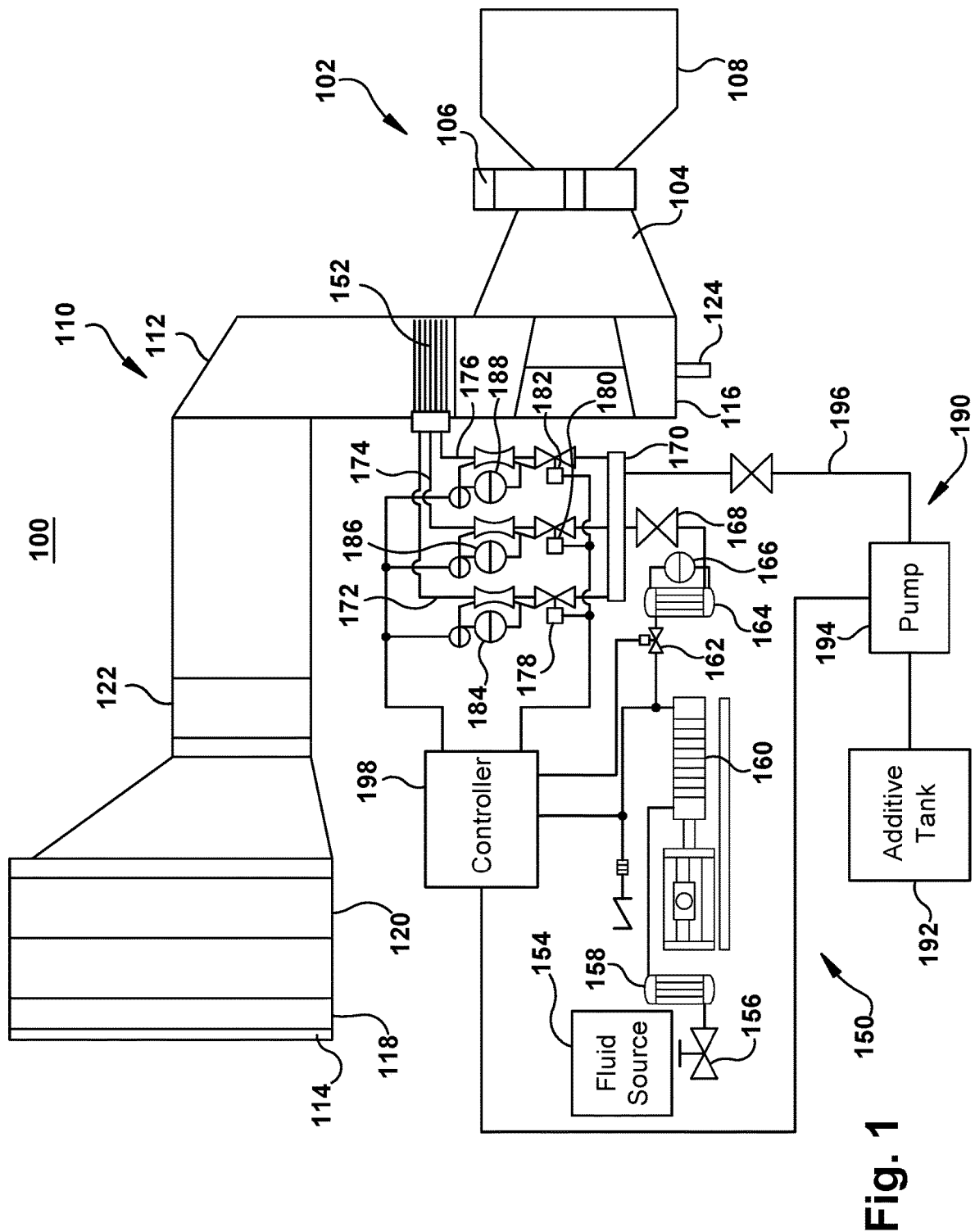
FIG. 1 shows a diagram of an example gas turbine combustion air cooling system.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In some embodiments, a fluid system, such as a gas turbine combustion fuel injection system and compressor wet compression system, may include one or more wear components that suffer surface erosion or other changes that changes one or more critical dimensions. A wet compression system is to use the water evaporative latent heat to cool the air during the compression process inside a compressor to reduce specific compression work, therefore to increase gas turbine power output and overall efficiency. Such fluid systems may include any system relying at least in part on controlled movement of material components in solid or fluid states, including various configurations of fluid injection systems, such as combustion systems. Other fluid injection systems may include various sprayers, drip systems, material application jets and streams, and other industrial systems combining fluid sources, fluid paths, and fluid nozzles, including spray nozzles, stream nozzles, laminar flow nozzles, and drip nozzles. Wear components may include components with at least one defined surface exposed to mechanical or electrochemical wear during operation of the fluid system. In some embodiments, the wear components include one or more components with surfaces defining or adjacent to a fluid path through the system and subject to wear from contact with the fluid and related fluid flows. For example, the fluid nozzle for dispersing fluid from a pressurized fluid path may include internal surfaces, including those defining the aperture through which the fluid leaves the nozzle. In some embodiments, the wear components may include surfaces subject to gas flows and/or periodic contact with other solid surfaces and positioned in the fluid system such that fluid or gas flows including additive coatings could reach and deposit materials on their exposed surfaces during operation of the fluid system. Operation of a fluid system may be the normal operation of the machine for its intended commercial purpose, exclusive of installation, maintenance, repair, storage, recovery, or other functions that interrupt normal operation. Critical dimensions may be physical distances defined by one or more component surfaces that materially contribute to the operability and/or efficiency of a fluid system, where variation in the critical dimension changes the operating performance or likelihood of failure of the component or system in a material way.

FIG. 1 depicts an example gas turbine system 100 with a wet compression subsystem 150 employing an additive coating fluid path 190. In some embodiments, gas turbine system 100 may include a gas turbine 102, including a compressor 104, a combustor 106, and a turbine section 108. Gas turbine 102 may operate on a common shaft and connect to a load, such as a generator. Normal operation of gas turbine 102 may include consumption of fuel to generate one or more energy outputs to other systems.

In the embodiment shown, gas turbine system 100 includes an air intake subsystem 110 to provide combustion air into compressor 104. For example, air intake subsystem 110 may include a series of ductwork 112 from an ambient air intake 114 to a compressor inlet chamber 116. Air from outside gas turbine system 100 may enter ambient air intake 114 and pass through inlet filter 118 to travel along the path defined by ductwork 112. Air intake subsystem 110 may include a number of additional functional components along the path of ductwork 112. For example, air intake subsystem 110 may include an evaporative cooler filter 120 to reduce the temperature of air entering through ambient air intake 114. Air intake subsystem 110 may include inlet silencers 122 to reduce the noise of gas turbine compressor 104 to meet power plant noise requirement. In the embodiment shown, air intake subsystem 110 includes air cooling subsystem 150 and, more specifically, a wet compression spray system. The portion of air cooling subsystem 150 that may be disposed along the path of ductwork 112 may include an array of spray nozzles 152 or other fluid nozzles. For example, spray nozzles 152 may include a two dimensional grid of liquid nozzles on a frame perpendicular to the air flow path through ductwork 112. The grid of liquid nozzles may be supported by a lattice of support members that include fluid channels for one or more fluid paths connecting to each spray nozzle (not individually shown) in array of spray nozzles 152. In some embodiments, spray nozzles 152 may be distributed across the cross section of ductwork 112 and the support lattice defines a plurality of open squares through which the air may pass around the nozzles and support lattice. The nozzles arrangement is configured to have optimal water/air ratio that minimizes the temperature distortion both radially and circumferentially inside the compressor. Air intake subsystem 110 may incorporate a drain 124 to enable condensed fluid to flow out of air intake subsystem 110 rather than being sucked into compressor 104.

Air cooling subsystem 150 may include a network of fluid sources, fluid paths, pumps, filters, and valves for providing cooling fluids, generally water, to spray nozzles 152 in the intake air flow path of intake air intake subsystem 110. For example, combustion air cooling subsystem 150 may include a fluid source 154, such as a water tank or connection to a plant water system or water service, containing a primary cooling fluid for use by combustion air cooling subsystem 150. In the embodiment shown, fluid source 154 is connected to air cooling subsystem 150 by a source valve 156 and source filter 158 and fluid flows along a fluid path, such as through a pipe, to a primary pump 160. For example, primary pump 160 may be a motor-driven centrifugal pump, positive displacement pump, diaphragm pump, magnetic drive pump, peristaltic pump, or gear, drum, piston, or other pump. Primary pump 160 pumps the primary fluid along a fluid path that may include a control valve 162, filter 164, sensor 166, and distribution valve 168 before reaching a distribution manifold 170 for one or more fluid paths 172, 174, 176 for one or more sections of spray nozzles 152. In various embodiments, any number of fluid paths to spray nozzles 152 may be possible. In some embodiments, fluid paths 172, 174, 176 may correspond to different zones in the array of fluid nozzles 152. In some embodiments, fluid paths 172, 174, 176 may be examples of individual fluid paths for each of spray nozzles 152. Fluid paths 172, 174, 176 may include nozzle path control valves 178, 180, 182 and nozzle sensors 184, 186, 188. Control valves 178, 180, 182 may enable the selective use and flow control for each fluid path and nozzle sensors 184, 186, 188 may provide sensor data for measuring or evaluating flow through each nozzle path. For example, nozzle sensors 184, 186, 188 may include pressure or flow sensors positioned to detect and quantify changes across the individual fluid paths. In some embodiments, nozzle sensors 184, 186, 188 may include other sensing modalities, such as temperature, particulate, electrochemical, electrical conductivity, or other sensors.

Air cooling subsystem 150 may include an additive coating fluid path 190 for selectively providing additive coating material into fluid paths 172, 174, 176 for one or more of spray nozzles 152. An additive tank 192 may provide a reservoir or source of an additive coating material that may be dispensed into the primary fluid path via distribution manifold 170 of combustion air cooling subsystem 150. In some embodiments, the additive coating material may be a water-borne anti-corrosive surface coating additive that may be mixed with water in the primary fluid path and thereby distributed to spray nozzles 152. For example, a combination vapor phase corrosion inhibitor and a non-zinc metal complex inhibitor may form a multilayer adhesive surface film on steel or similar metal surfaces in a wear component, with or without acrylic. In some embodiments, a multi-metal organic corrosion inhibitor additive may be used to coat steel, iron, aluminum alloy, galvanized steel, stainless steel, copper, and other metal wear components within the flow path of air cooling subsystem 150. Other water-borne coating additives with an affinity for the target surfaces may be used, including various combinations and dilutions thereof. In addition to the mechanical changes in the physical dimensions of component being coated, the additive coating material may be selected for providing enhanced resistance to further electrochemical erosion by providing a protective ion layer over the original component surface. In some embodiments, an additive pump 194 moves the additive coating material from additive tank 192 along an additive fluid path 196 and into the primary fluid path of combustion air cooling subsystem 150. In the embodiment shown, additive fluid path 196 selectively provides additive coating material into distribution manifold 170 where it can be directed along fluid paths 172, 174, 176 in a manner similar to the flow of the primary fluid. Distribution manifold 170 may enable additive coating material to enter fluid paths 172, 174, 176 prior to spray nozzles 152. In some embodiments, additive fluid path 196 may include its own manifold and/or more complex fluid paths for selectively intersecting one or more fluid paths 172, 174, 176. In some embodiments, additive coating material may be mixed with water in a desired proportion in additive tank 192 or elsewhere along additive fluid path 196 and a calculated proportion of additive coating material may be controllably mixed with the primary fluid flow to produce a desired proportion of additive coating material in the fluid reaching spray nozzles 152. In some embodiments, the fluid flow through additive fluid path 196 may include a sufficient proportion of the primary fluid, such as water, that the fluid flow through additive fluid path 196 may temporarily replace the primary fluid flow from fluid source 154 for some or all of fluid paths 172, 174, 176 while maintaining the cooling operation of combustion air cooling subsystem 150.

In some embodiments, the various sensors, control valves, and pump controls of combustion air cooling subsystem 150 may be connected to one or more controllers, such as controller 198. For example, controller 198 may be an integrated control system for air cooling subsystem 150, one or more system management applications on a general purpose computer, or an interface or subsystem of a larger industrial automation system. In some embodiments, controller 198 includes one or more programmed workflows for managing operation of combustion air cooling subsystem 150 in an automated fashion. For example, controller 198 may monitor data received from nozzle sensors 184, 186, 188 to determine when one or more control parameters, such as pressure or flow rate, reaches a threshold value indicative of a change in a critical dimension of one or more spray nozzles 152. For example, when pressure decreases without a commensurate change in pump pressure, fluid temperature, or other factors, an increase in the aperture width due to erosion in spray nozzles 152 may be identified. When such a threshold is reached, controller 198 may issue a control signal to additive pump 194 and/or any related fluid control valves to direct additive coating material from additive fluid path 196 into one or more of fluid paths 172, 174, 176 to reach the effected spray nozzles 152. Controller 198 may continue to monitor the relevant control parameters until the additive coating material through the effected spray nozzles provides a sufficient coating on the surfaces in the flow path to return the critical dimension back within tolerance such that additive pump 194 may be turned off and additive fluid path 196 may be again isolated from the primary flow paths. In some embodiments, pump speed, valve control, or other control features of additive coating fluid path 190 may be dynamically varied by controller 198 to adjust a proportion of additive coating mixed with the primary fluid and delivered through spray nozzles 152. These control features may enable controller 198 to automatically vary the proportion of additive coating and primary fluid among a plurality of proportion values based on the change in the critical dimension, such as aperture width, rather than one hundred percent additive coating fluid, one hundred percent primary fluid, or a single fixed proportion. Dynamic control of the proportion of additive coating to primary fluid may be implemented in cases where the proportion of additive coating may be continuously varied to maintain and/or restore the critical dimensions during operation of gas turbine system 100 and, more specifically, air cooling subsystem 150.

Figure 2:
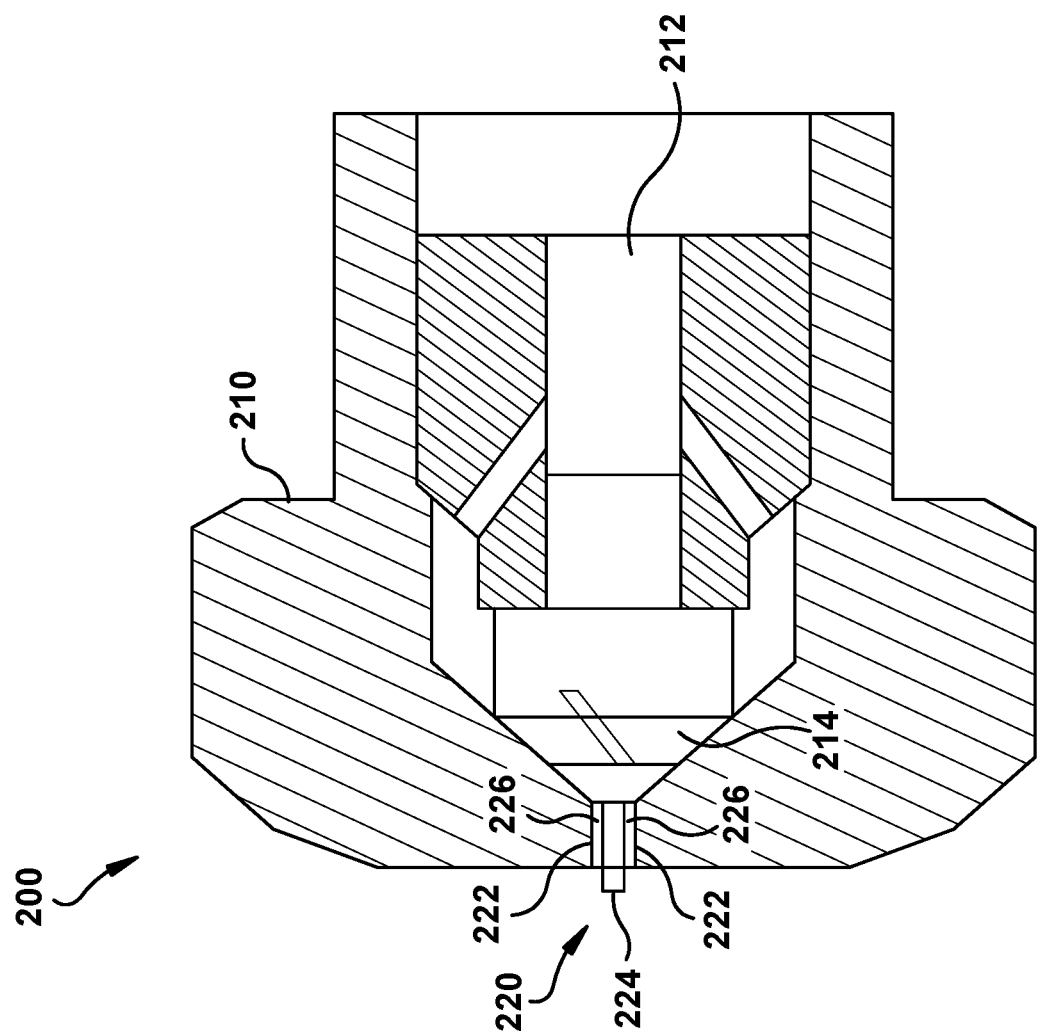
FIG. 2 shows a cross-sectional view of an example fluid nozzle.

FIG. 2 shows an example fluid nozzle 200, such as may be used for spray nozzles 152 in FIG. 1 and may include one or more surfaces to be coated to restore a critical dimension. Fluid nozzle 200 may include a body 210 defining an aperture 220 through which fluid passes to create the desired spray pattern. In some embodiments, body 210 may include threads, contact surfaces, or other attachment means for removably attaching to a frame (not shown) and connecting to a fluid path, such as fluid paths 172, 174, 176 in FIG. 1 for receiving fluid into an inlet 212 in the base of body 210. Fluid may enter through an inlet 212 and may pass into one or more fluid dynamic structures 214 for creating the desired spray pattern when the fluid leaves aperture 220. A variety of conventional spray nozzle structures with varying fluid dynamic arrangements may be used for creating various spray patterns and target droplet sizes, but generally rely on the dimensions of an outlet orifice, such as aperture 220 to control droplet size and distribution. Aperture 220 may be initially defined by internal surfaces 222 that surround a cylindrical through hole in body 210 and define an aperture width 224, which is the diameter across aperture 220 at its widest point. However, through mechanical and/or electrochemical erosion, aperture width 224 may increase over time. As explained herein, when a change in the critical dimension of aperture width 224 is detected, an additive coating material may be injected into the fluid entering through inlet 212 and may create surface coatings 226 through adhesion to internal surfaces 222 and/or prior coating layers. In some embodiments, a difference in the surface characteristics of fluid dynamic structures 214 versus internal surfaces 222 may encourage the creation of surface coatings 226 around aperture 220 with limited accumulation within fluid dynamic structures 214. In some embodiments, aperture width 224 may start in the range of hundreds of microns and surface wear of 1-10 microns may substantially change the droplet size, distribution, and dispersion through fluid nozzle 200. For example, a coating layer of 1-5 microns on internal surfaces 222 may reduce the aperture width by 2-10 microns, with an even more significant variation in aperture area (cross-sectional area of the flow path calculated from aperture width) and available flow path. Such small changes in flow path is sufficient to change the fluid velocity, therefore, droplet size and flow rate significantly.

The embodiments described in FIGS. 1 and 2 are made with reference to applying an additive coating to the internal surfaces of a component with critical dimensions in a fluid flow path. Aperture width of a fluid nozzle is provided as an example only and other embodiments may provide coatings to internal or external surfaces of other wear components that may selectively receive a fluid flow to which a coating additive can be added during normal operation of a machine. For example, pipes, channels, valves, fittings, sensors, fluid dynamic structures, and other components in a fluid path may be subject to wear that alters a critical dimension, such as increasing the width of a fluid restriction path that is important to performance and/or pressure, flow, or other parameters.

Figure 3:
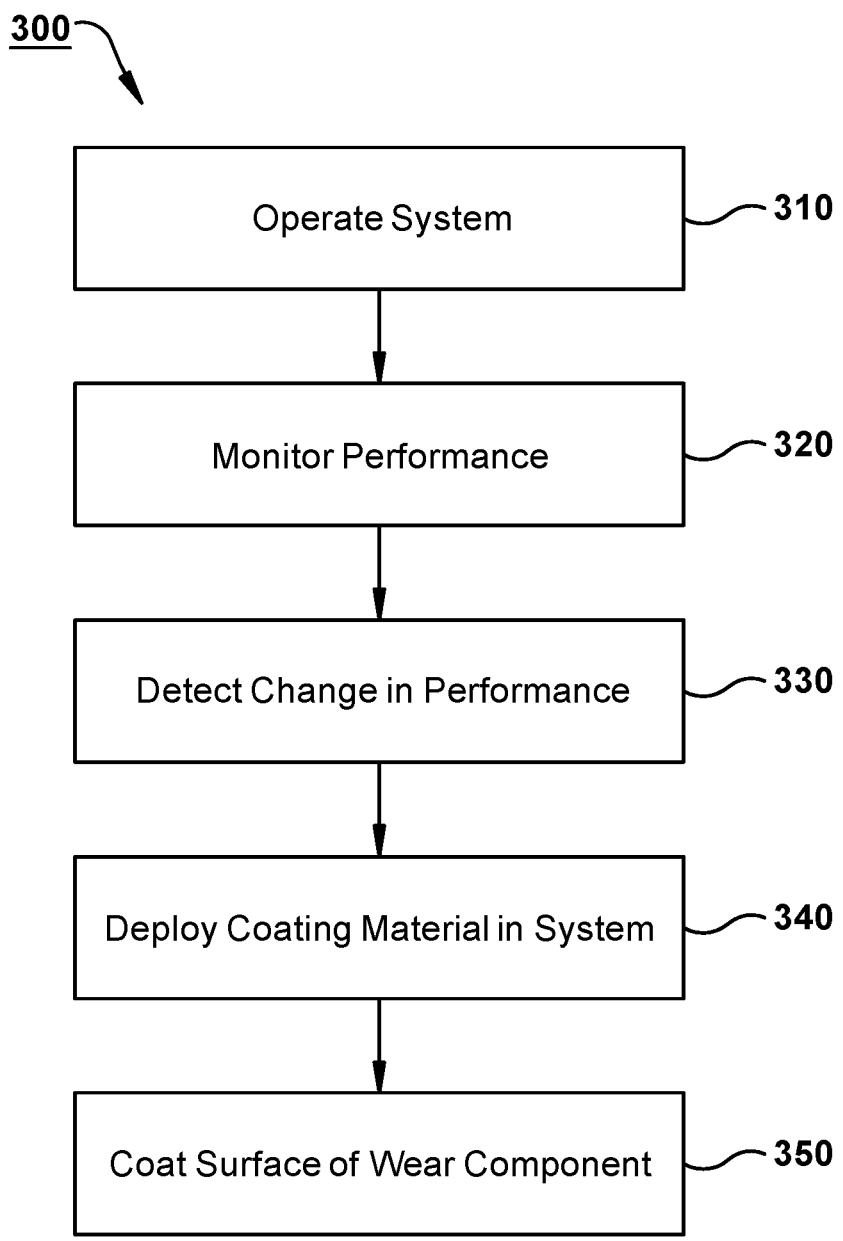
FIG. 3 shows an example method of using a coating to control component dimensions.

FIG. 3 shows an example method 300 of using a coating to control component dimensions, such as may be used with gas turbine system 100 with combustion air cooling subsystem 150 in FIG. 1. In process 310, a system is operated in accordance with its normal operating conditions. For example, gas turbine system 100 may be operated to convert a fuel source into rotational motion to drive a generator, including the use of air cooling subsystem 150 to cool the air during the compression for more efficient operation of gas turbine system 100. More specifically, this may include pumping primary fluid, such as water, through spray nozzles 152 as needed for air cooling. In process 320, performance related to operation of relevant subcomponents is monitored. For example, controller 198 (FIG. 1) may gather operational data from sensors in combustion air cooling subsystem 150 to monitor pressure and fluid flows. More generally, a plant management system may integrate sensor data from combustion air cooling subsystem 150 and other systems and subsystems associated with gas turbine system 100 to monitor performance, manage maintenance, and detect and predict failure modes. In process 330, a change is detected in a critical dimension of a wear component from surface erosion of at least one surface in the wear component. This change may be detected directly or indirectly from system performance data. For example, a detected pressure change in a fluid path in combustion air cooling subsystem 150 may correlate to wear of one or more spray nozzles 152 that has changed a critical dimension. More specifically, the pressure in a fluid path may be monitored for a threshold pressure change and detecting the threshold pressure change may trigger an automated system response, such as process 340. Other configurations for directly or indirectly detecting a change in a critical dimension are also possible, including other correlations in system parameters, direct measurement with optical, acoustic, or similar surface measurement techniques, or detection of other secondary indicia. In some embodiments, controller 198 (FIG. 1) may generate a control signal based on detecting the change in the critical dimension to initiate process 340. In process 340, an additive coating material is deployed into the system in response to the detected change, without interrupting normal operation of the system. For example, an additive coating material may be injected into the primary fluid path, such as distribution manifold 170 (FIG. 1), for a fluid-based system to deploy the coating material to one or more surfaces along the fluid path. More specifically, a water-borne additive coating may be mixed into the water distributed through a fluid nozzle system, such as spray nozzles 152 (FIG. 1). For example, pumps and valves related to the fluid path for the additive coating material may respond to the control signal from controller 198 to deploy the additive coating material into the primary fluid path. In process 350, the additive coating material coats the worn surfaces or surfaces of the wear components with detected changes in critical dimensions to offset at least a portion of the change in the critical dimensions of the wear components. For example, the additive coating may be formulated to adhere to specific material surfaces in the fluid path through which it is deployed. More specifically, the additive coating material may coat the worn surfaces at the aperture, e.g., aperture 220 (FIG. 2) of the spray nozzles 152 in combustion air cooling subsystem 150 and reduce the aperture width, e.g., aperture width 224 (FIG. 2) to restore control of droplet size, distribution, and dispersion.

Figure 4:
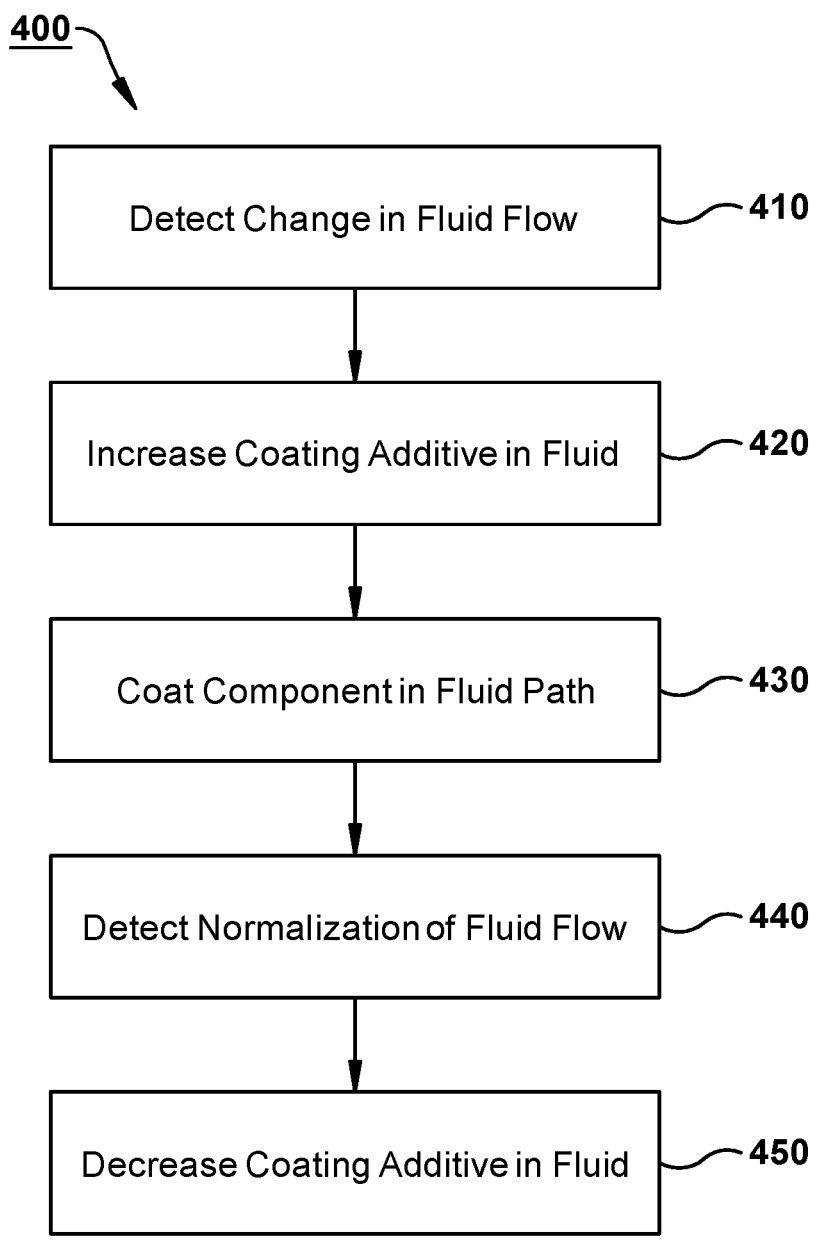
FIG. 4 shows an example method of controlling fluid flow using a coating additive.

FIG. 4 shows an example method 400 of controlling fluid flow using a coating additive, such as may be used with gas turbine system 100 with combustion air cooling subsystem 150 in FIG. 1. In process 410, a change in fluid flow is detected. For example, one of the nozzle sensors 184, 186, 188 (FIG. 1) in fluid paths 172, 174, 176 (FIG. 1) may detect a reduction in pressure related to a particular spray nozzle among spray nozzles 152 (FIG. 1), suggesting an increase in aperture width, e.g., aperture width 224 (FIG. 2), due to erosion of the surfaces defining the aperture. In process 420, the coating additive coating material in the fluid is increased. For example, a primary fluid, such as water, may be dosed with coating additive coating material to achieve a desired proportion. In process 430, the primary fluid with increased coating additive coating material reaches the surface of the wear component and coats the surface with coating material. For example, an anti-corrosive coating with an affinity for the worn surface may adhere to the worn surface and produce a coating layer. In process 440, another change in fluid flow is detected, but in the direction of a normalized fluid flow. For example, as the coating layers return the aperture width closer to its starting value and/or preferred operating range, the pressure sensed by the pressure sensors may return to its normal range. In process 450, the coating additive coating material in the fluid is decreased. For example, the amount of coating additive coating material being added to the water may be decreased and the water with the higher proportion of coating additive coating material will flush out of the fluid path, returning the fluid to a lower proportion or primary fluid only.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
- operating a fluid injection system including a wear component having a critical dimension defined by at least one internal surface of the wear component;
- detecting a change in the critical dimension of the wear component from surface erosion of the at least one internal surface by detecting a change in an aperture width of the wear component or detecting a change in fluid flow through the wear component;
- deploying an additive coating material into the fluid injection system during operation of the fluid injection system and in response to detecting the change in the critical dimension; and
- coating the at least one internal surface with the additive coating material to offset at least a portion of the change in the critical dimension.

2. The method of claim 1, wherein the wear component is a fluid nozzle of the fluid injection system.

3. The method of claim 2, wherein detecting the change in the critical dimension includes detecting the change in the aperture width of the fluid nozzle.

4. The method of claim 2, wherein detecting the change in the critical dimension includes detecting the change in fluid flow through the fluid nozzle.

5. The method of claim 4, wherein the change in fluid flow is detected by measuring a pressure change in a fluid path of the fluid injection system, the fluid path providing fluid through the fluid nozzle.

6. The method of claim 2, wherein the fluid injection system provides a primary fluid through the fluid nozzle during operation, and deploying the additive coating material includes controllably adding a desired proportion of the additive coating material into the primary fluid prior to the primary fluid reaching the fluid nozzle.

7. The method of claim 6, wherein the primary fluid is water, and the additive coating material is a water-borne anti-corrosive surface coating additive.

8. The method of claim 6, wherein the desired proportion of the additive coating material is automatically varied among a plurality of proportion values based on the detected change in the aperture width.

9. The method of claim 1, wherein coating the at least one internal surface includes adhering the additive coating material to the at least one internal surface in a thickness in the range of 1-5 microns.

10. The method of claim 1, wherein the fluid injection system is a gas turbine, and the wear component is a surface component subject to erosion during operation of the gas turbine.

* * * * *